(12) United States Patent
Wang et al.

(10) Patent No.: US 10,645,354 B2
(45) Date of Patent: May 5, 2020

(54) PROJECTION TERMINAL KEYSTONE CORRECTION METHOD AND DEVICE, AND PROJECTION TERMINAL AND STORAGE MEDIUM

(71) Applicant: ZTE CORPORATION, Shenzhen, Guangdong Province (CN)

(72) Inventors: Yuchen Wang, Shenzhen (CN); Junyan Zhang, Shenzhen (CN)

(73) Assignee: ZTE CORPORATION (CN)

( * ) Notice: Subject to any disclaimer, the term of this patent is extended or adjusted under 35 U.S.C. 154(b) by 96 days.

(21) Appl. No.: 15/739,786

(22) PCT Filed: Aug. 27, 2015

(86) PCT No.: PCT/CN2015/088299
§ 371 (c)(1),
(2) Date: Dec. 26, 2017

(87) PCT Pub. No.: WO2017/004871
PCT Pub. Date: Jan. 12, 2017

(65) Prior Publication Data
US 2018/0192015 A1 Jul. 5, 2018

(30) Foreign Application Priority Data
Jul. 3, 2015 (CN) .......................... 2015 1 0391656

(51) Int. Cl.
*H04N 9/31* (2006.01)
*H04N 5/74* (2006.01)

(52) U.S. Cl.
CPC ............. *H04N 9/3185* (2013.01); *H04N 9/31* (2013.01); *H04N 9/3152* (2013.01); *H04N 9/3194* (2013.01); *H04N 5/74* (2013.01)

(58) Field of Classification Search
CPC ...... H04N 9/3185; H04N 9/31; H04N 9/3152; H04N 9/3194; H04N 5/74
(Continued)

(56) References Cited

U.S. PATENT DOCUMENTS

2005/0046803 A1  3/2005  Akutsu
2005/0099609 A1  5/2005  Masuzawa et al.
(Continued)

FOREIGN PATENT DOCUMENTS

CN   1768352       5/2006
CN   1823523 A     8/2006
(Continued)

*Primary Examiner* — Jerry L Brooks
(74) *Attorney, Agent, or Firm* — McDonald Hopkins LLC

(57) ABSTRACT

Embodiments of the present disclosure disclose a keystone correction method for a projection terminal including: when an included angle between a projection centerline of the projection terminal and a horizontal plane is greater than a set acute angle, determining a direction of a projection plane according to a size relationship between a distance of the projection terminal to the projection plane along a first projection line and a distance of the projection terminal to the projection plane along a second projection line, the first projection line and the second projection line having different projection angles; and performing a keystone correction for the projection terminal according to the direction of the projection plane. Embodiments of the present disclosure further disclose a keystone correction device for a projection terminal, a projection terminal and a computer storage medium.

14 Claims, 5 Drawing Sheets

100

Determine a direction of a projection plane according to a size relationship between a distance of a projection terminal to the projection plane along a first projection line and a distance of the projection terminal to the projection plane along a second projection line

101

Perform a keystone correction for the projection terminal according to the direction of the projection plane

(58) Field of Classification Search
USPC .......................................................... 353/70
See application file for complete search history.

(56) References Cited

U.S. PATENT DOCUMENTS

| | | |
|---|---|---|
| 2014/0066127 A1 | 3/2014 | Naiki et al. |
| 2015/0070663 A1* | 3/2015 | Watanuki ............ G03B 21/145 |
| | | 353/70 |
| 2015/0187057 A1 | 7/2015 | Kobayashi et al. |
| 2015/0331302 A1 | 11/2015 | Watanuki et al. |

FOREIGN PATENT DOCUMENTS

| | | |
|---|---|---|
| CN | 1924693 A | 3/2007 |
| CN | 102650805 A | 8/2012 |
| CN | 102998885 A | 3/2013 |
| CN | 103974048 A | 8/2014 |
| JP | 2010-28412 A | 2/2010 |

* cited by examiner

PROJECTION TERMINAL KEYSTONE CORRECTION METHOD AND DEVICE, AND PROJECTION TERMINAL AND STORAGE MEDIUM

TECHNICAL FIELD

The present disclosure relates to a projection terminal image correction technology, and in particularly, to a method and keystone correction device for a projection terminal, a projection terminal and a storage medium.

BACKGROUND

When a projection terminal is placed, it is difficult for a projection centerline of the projection terminal to be perpendicular to a projection screen and directly opposite to a center point of the projection screen. Thus, when projection light from the projection terminal to the projection screen is shorter, diffusion of the light on the projection screen is smaller; while when the projection light from the projection terminal to the projection screen is longer, diffusion of the light on the projection screen is larger, and widths of upper and lower sides of an image projected on the projection screen will be different, i.e., a trapezoidal image will appear on the projection screen.

In the existing art, the above problem can be solved by the keystone correction technology. The principle of the keystone correction technology is to adjust and compensate for a shape of an image before projection by using electronic devices and an interpolation algorithm, such that the image projected on the projection screen becomes a rectangular image. In the existing keystone correction technology, the working principle of the automatic keystone correction technology includes the following steps. An included angle between the projection centerline of the projection terminal and a projection plane (projection screen) is detected firstly, for example, an accelerometer is provided in the projection terminal and used to detect the included angle between the projection centerline of the projection terminal and the projection plane (projection screen). After the included angle between the projection centerline of the projection terminal and the projection plane is obtained, trapezoidal distortion of the image is automatically corrected according to the included angle between the projection centerline of the projection terminal and the projection plane.

However, in practical applications, it is found that the effect of the keystone correction is very poor in some cases.

SUMMARY

Embodiments of the present disclosure provide a keystone correction method and device for a projection terminal, a projection terminal and a storage medium, to improve the correction effect of trapezoidal distortion. The technical scheme of the embodiments of the present disclosure is implemented as below.

An embodiment of the present disclosure proposes a keystone correction method for a projection terminal. And the method includes:

when an included angle between a projection centerline of the projection terminal and a horizontal plane is greater than a set acute angle, determining a direction of a projection plane according to a size relationship between a distance of the projection terminal to the projection plane along a first projection line and a distance of the projection terminal to the projection plane along a second projection line, herein the first projection line and the second projection line have different projection angles; and performing a keystone correction for the projection terminal according to the direction of the projection plane.

In the scheme described above, determining the direction of the projection plane according to the size relationship between the distance of the projection terminal to the projection plane along the first projection line and the distance of the projection terminal to the projection plane along the second projection line includes:

obtaining the distance of the projection terminal to the projection plane along the first projection line and the distance of the projection terminal to the projection plane along the second projection line;

when a projection angle of the first projection line is less than a projection angle of the second projection line, if the distance of the projection terminal to the projection plane along the first projection line is greater than the distance of the projection terminal to the projection plane along the second projection line, the direction of the projection plane is horizontal; otherwise the direction of the projection plane is vertical; and when the projection angle of the first projection line is greater than the projection angle of the second projection line, if the distance of the projection terminal to the projection plane along the first projection line is less than the distance of the projection terminal to the projection plane along the second projection line, the direction of the projection plane is horizontal; otherwise the direction of the projection plane is vertical.

In the scheme described above, obtaining the distance of the projection terminal to the projection plane along the first projection line and the distance of the projection terminal to the projection plane along the second projection line includes:

obtaining in sequence the distance of the projection terminal to the projection plane along the first projection line and the distance of the projection terminal to the projection plane along the second projection line or obtaining simultaneously the distance of the projection terminal to the projection plane along the first projection line and the distance of the projection terminal to the projection plane along the second projection line.

In the scheme described above, the first projection line and the second projection line are any two of the following three projection lines: a projection line of which a projection angle is maximum among all projection lines from the projection terminal to the projection plane, and a projection line of which a projection angle is minimum among all projection lines from the projection terminal to the projection plane, and the projection centerline of the projection terminal.

In the scheme described above, performing the keystone correction for the projection terminal according to the direction of the projection plane includes:

obtaining an angle between the projection centerline of the projection terminal and the projection plane according to the direction of the projection plane and the included angle between the projection centerline of the projection terminal and the horizontal plane; and performing the keystone correction for the projection terminal based on the angle between the projection centerline of the projection terminal and the projection plane.

An embodiment of the present disclosure further proposes a keystone correction device for a projection terminal including a determination module and a keystone correction module.

The determination module is configured to, when an included angle between a projection centerline of the projection terminal and a horizontal plane is greater than a set acute angle, determine a direction of a projection plane according to a size relationship between a distance of the projection terminal to the projection plane along a first projection line and a distance of the projection terminal to the projection plane along a second projection line. Herein, the first projection line and the second projection line have different projection angles.

The keystone correction module is configured to, perform a keystone correction for the projection terminal according to the direction of the projection plane.

In the scheme described above, the determination module is configured to obtain the distance of the projection terminal to the projection plane along the first projection line and the distance of the projection terminal to the projection plane along the second projection line; when a projection angle of the first projection line is less than a projection angle of the second projection line, if the distance of the projection terminal to the projection plane along the first projection line is greater than the distance of the projection terminal to the projection plane along the second projection line, the direction of the projection plane is horizontal; otherwise the direction of the projection plane is vertical; and when the projection angle of the first projection line is greater than the projection angle of the second projection line, if the distance of the projection terminal to the projection plane along the first projection line is less than the distance of the projection terminal to the projection plane along the second projection line, the direction of the projection plane is horizontal; otherwise the direction of the projection plane is vertical.

In the scheme described above, the determination module is configured to obtain in sequence the distance of the projection terminal to the projection plane along the first projection line and the distance of the projection terminal to the projection plane along the second projection line, or to obtain simultaneously the distance of the projection terminal to the projection plane along the first projection line and the distance of the projection terminal to the projection plane along the second projection line.

In the scheme described above, the first projection line and the second projection line are any two of the following three projection lines: a projection line of which a projection angle is maximum among all projection lines from the projection terminal to the projection plane, and a projection line of which a projection angle is minimum among all projection lines from the projection terminal to the projection plane, and the projection centerline of the projection terminal.

In the scheme described above, the keystone correction module is configured to obtain an angle between the projection centerline of the projection terminal and the projection plane according to the direction of the projection plane and the included angle between the projection centerline of the projection terminal and the horizontal plane; and perform the keystone correction for the projection terminal based on the angle between the projection centerline of the projection terminal and the projection plane.

An embodiment of the present disclosure further proposes a projection terminal including any device described above.

An embodiment of the present disclosure further provides a computer storage medium having computer-executable instructions stored therein, which are used to carry out any keystone correction method for the projection terminal described above.

Embodiments of the present disclosure provide a keystone correction method and device for a projection terminal, a projection terminal and a storage medium, such that when an included angle between a projection centerline of the projection terminal and a horizontal plane is greater than 45°, a direction of a projection plane is determined by comparing distances of the projection terminal to the projection plane along multiple projection lines of the projection terminal, to obtain an included angle between the projection centerline of the projection terminal and the projection plane, implementing the keystone correction for the projection terminal.

DETAILED DESCRIPTION

Figure 1:
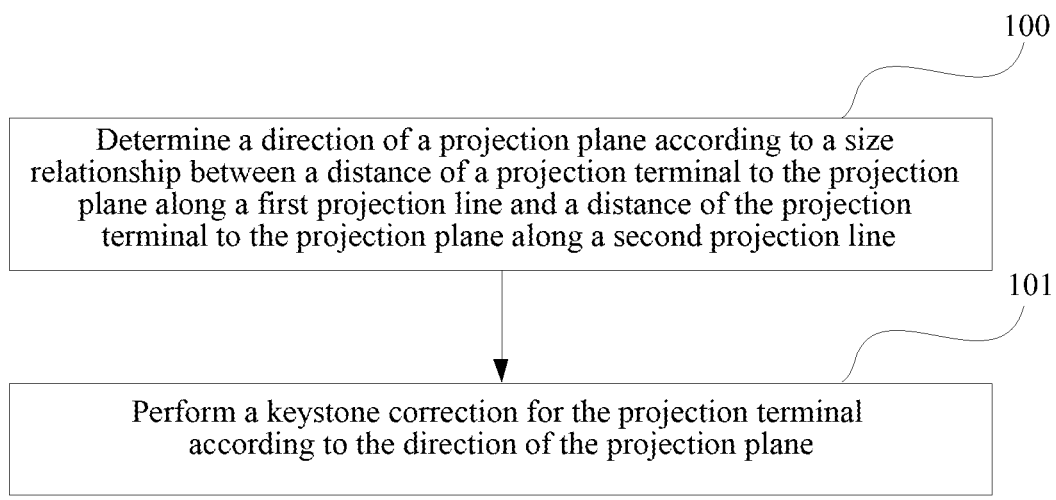
FIG. 1 is a flow chart of a first embodiment of a keystone correction method for a projection terminal in accordance with the present disclosure.

The technical scheme in embodiments of the present disclosure will be described clearly and completely in conjunction with the accompanying drawings in the embodiments of the present disclosure. It should be understood that the alternative embodiments described below are used to illustrate and explain the present disclosure and are not intended to limit the present disclosure.

Research shows that by using the current automatic keystone correction technology, correct keystone correction for a projection terminal can be performed only when an included angle between a projection centerline of the projection terminal and a horizontal plane is less than a certain angle. The reason is that when the included angle between the projection centerline of the projection terminal and the horizontal plane is larger, it cannot be determined whether a direction of a projection plane is horizontal or vertical. If the direction of the projection plane is horizontal, for example, the projection plane is a ceiling or floor, then an included angle between the projection centerline of the projection terminal and the projection plane is equal to the included angle between the projection centerline of the projection terminal and the horizontal plane. If the direction of the projection plane is vertical, for example, the projection plane is a wall, then the included angle between the projection centerline of the projection terminal and the projection plane is equal to 90° minus the included angle between the projection centerline of the projection terminal and the horizontal plane. Therefore, when whether the direction of the projection plane is horizontal or vertical cannot be determined, for the calculated included angle between the projection centerline of the projection terminal and the projection plane an error may occur, and further, keystone correction cannot be performed correctly. Therefore, based on this, when the included angle between the projection centerline of the projection terminal and the horizontal plane is greater than a set acute angle, the direction of the projection plane is determined according to a size relationship between a distance of the projection terminal to the projection plane along a first projection line and a distance of the projection terminal to the projection plane along a second projection line, and keystone correction for the projection terminal is performed according to the direction of the projection plane. Thus, the problem of poor correction effect due to uncertainty of the direction of the projection plane in some cases is solved in the keystone correction process. In various embodiments of the present disclosure, the projection terminal includes, but is not limited to, projectors and other projection products; and the projection centerline of the projection terminal refers to a centerline of all projection lines of the projection terminal, and the range of the included angle between the projection centerline of the projection terminal and the horizontal plane may be 0° to 90°.

First Embodiment

FIG. 1 is a flow chart of the first embodiment of a keystone correction method for a projection terminal in accordance with the present disclosure. As shown in FIG. 1, the method includes the following steps 100-101.

In step 100, when an included angle between a projection centerline of the projection terminal and a horizontal plane is greater than a set acute angle, a direction of a projection plane is determined according to a size relationship between a distance of the projection terminal to the projection plane along a first projection line and a distance of the projection terminal to the projection plane along a second projection line, herein the first projection line and the second projection line have different projection angles.

Here, the set acute angle may be an angle greater than 40°, and a protection angle of a projection line of the projection terminal is an included angle between the projection line of the projection terminal and a projection of the projection centerline of the projection terminal on the horizontal plane, and the range of the projection angle of the projection line of the projection terminal is from 0° to 180°.

In this step, the step that the direction of the projection plane is determined according to the size relationship between the distance of the projection terminal to the projection plane along the first projection line and the distance of the projection terminal to the projection plane along the second projection line includes the following operations.

The distance of the projection terminal to the projection plane along the first projection line and the distance of the projection terminal to the projection plane along the second projection line are obtained. If the projection angle of the first projection line is less than the projection angle of the second projection line and the distance of the projection terminal to the projection plane along the first projection line is greater than the distance of the projection terminal to the projection plane along the second projection line, or if the projection angle of the first projection line is greater than the projection angle of the second projection line and the distance of the projection terminal to the projection plane along the first projection line is less than the distance of the projection terminal to the projection plane along the second projection line, then the direction of the projection plane is horizontal; otherwise the direction of the projection plane is vertical.

In an embodiment, when the distance of the projection terminal to the projection plane along the first projection line and the distance of the projection terminal to the projection plane along the second projection line are obtained, the distance of the projection terminal to the projection plane along the first projection line and the distance of the projection terminal to the projection plane along the second projection line may be obtained in sequence, or the distance of the projection terminal to the projection plane along the first projection line and the distance of the projection terminal to the projection plane along the second projection line may obtained simultaneously.

In this step, the first projection line and the second projection line may be any two of the following three projection lines: a projection line of which a projection angle is maximum among all projection lines from the projection terminal to the projection plane, and a projection line of which a projection angle is minimum among all projection lines from the projection terminal to the projection plane, and the projection centerline of the projection terminal. For example, one of the first projection line and the second projection line is the projection line of which the projection angle is maximum among all the projection lines from the projection terminal to the projection plane, and the other is the projection line of which the projection angle is minimum among all the projection lines from the projection terminal to the projection plane.

In this step, when the direction of the projection plane is horizontal, the projection plane may be a projection screen parallel to the horizontal plane, such as ceiling or floor; when the direction of the projection plane is vertical, the projection plane may be a projection screen or wall perpendicular to the horizontal plane.

In step 101, keystone correction for the projection terminal is performed according to the direction of the projection plane.

Specifically, the step that the keystone correction for the projection terminal is performed according to the direction of the projection plane includes: an angle between the projection centerline of the projection terminal and the projection plane is obtained according to the direction of the projection plane and the included angle between the projection centerline of the projection terminal and the horizontal plane. Here, if the direction of the projection plane is horizontal, then an included angle between the projection centerline of the projection terminal and the projection plane is equal to the included angle between the projection terminal and the horizontal plane; and if the direction of the projection plane is vertical, then the included angle between the projection centerline of the projection terminal and the projection plane is equal to 90° minus the included angle between the projection terminal and the horizontal plane.

After the angle between the projection centerline of the projection terminal and the projection plane is obtained, the keystone correction for the projection terminal is performed based on the angle between the projection centerline of the projection terminal and the projection plane.

After the angle between the projection centerline of the projection terminal and the projection plane is known, the keystone correction for the projection terminal may be performed by using a variety of existing implementation manners, for example, the keystone correction for the projection terminal may be performed by a master control chip of a projector according to the angle between the projection centerline of the projection terminal and the projection plane by inputting the angle between the projection centerline of the projection terminal and the projection plane into the master control chip of the projector located on a mainboard of the projector. Herein, models of the master control chip of the projector include, but are not limited to, DDP2000 and DDP2230.

Second Embodiment

Figure 2:
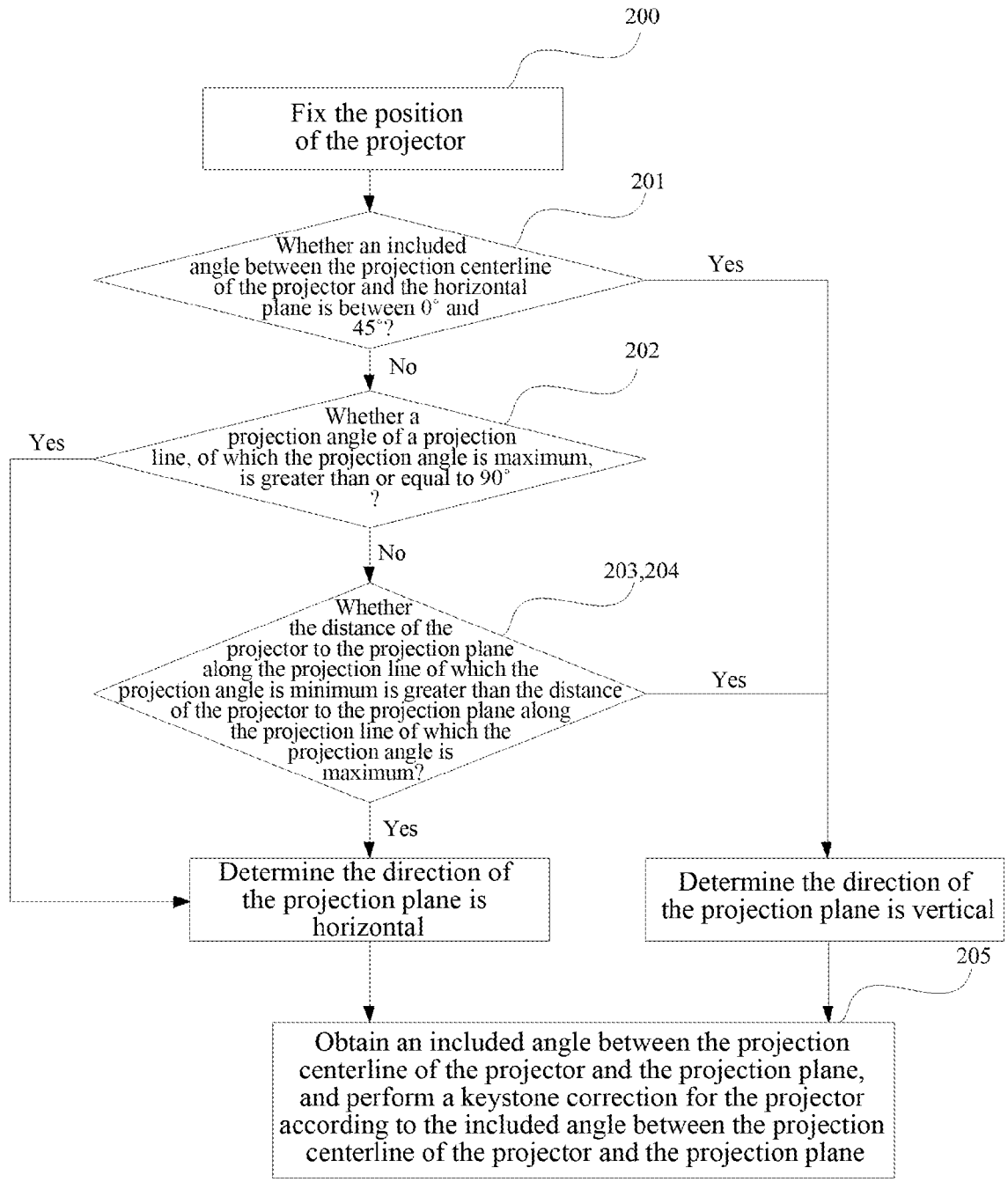
FIG. 2 is a flow chart of a second embodiment of a keystone correction method for a projection terminal in accordance with the present disclosure.

This embodiment will be illustrated by way of example on the basis of the embodiment described above. FIG. 2 is a flow chart of the second embodiment of a keystone correction method for a projection terminal in accordance with the present disclosure. As shown in FIG. 2, the method includes the following steps.

In step 200, the position of the projector is fixed.

In this step, whether the position of the projector is fixed may be detected by using the following manners. When the projector projects light, it is detected whether the included angle between the projection centerline of the projector and the horizontal plane changes. If the included angle between the projection centerline of the projector and the horizontal plane changes, the process ends. And when there is no change in the included angle between the projection centerline of the projector and the horizontal plane, step 201 will be performed. If the included angle between the projection centerline of the projector and the horizontal plane does not change, it shows that the position of the projector has been fixed, and step 201 will be performed. Thus, only when the position of the projector position is fixed, subsequent steps can be performed. When the position of the projector changes due to various reasons, the keystone correction for the projector needs to be re-performed.

In step 201, when the projector projects light, the include angle between the projection centerline of the projector and the horizontal plane is obtained by measuring. If the included angle between the projection centerline of the projector and the horizontal plane is between 0° to 45°, it is determined that the direction of the projection plane is vertical, i.e., the projection plane is perpendicular to the horizontal plane. If the included angle between the projection centerline of the projector and the horizontal plane is greater than 45° and less than 90°, the step 202 will be performed.

Here, the projection centerline of the projector may direct towards an upper inclined side of or just above the horizontal plane, or direct towards a lower inclined side of or just below the horizontal plane. When the projection centerline of the projector directs towards the upper inclined side of the horizontal plane, the projection plane may be a projection screen perpendicular to the horizontal plane, a wall, a ceiling or a projection screen parallel to the horizontal plane. When the projection centerline of the projector directs towards the lower inclined side of the horizontal plane, the projection plane may be a projection screen perpendicular to the horizontal plane, a wall, a floor or a projection screen parallel to the horizontal plane.

In practical applications, the include angle between the projection centerline of the projector and the horizontal plane may be measured by an angle measurement module, which is located inside the projector. The angle measurement module includes, but is not limited to, a gyroscope and an accelerometer.

In step 202, among all projection lines from the projector to the projection plane, if a projection angle of a projection line, of which the projection angle is maximum, is greater than or equal to 90°, then it is determined that the direction of the projection plane is horizontal; and if the projection angle of the projection line, of which the projection angle is maximum, is less than 90°, the step 203 will be performed.

In this step, when the projection angle of the projection line, of which the projection angle is maximum, is greater than or equal to 90°, because the included angle between the projection centerline of the projector and the horizontal plane is greater than 45° and less than 90°, it is not possible that the projection plane is a vertical projection plane according to geometrical analysis. In this case, if the projection plane is the vertical projection plane, the projection line of which the projection angle is maximum cannot be projected onto the projection plane.

Two cases will be described below. In the first case, the projection centerline of the projector directs towards the upper inclined side of or just above the horizontal plane.

Figure 3:
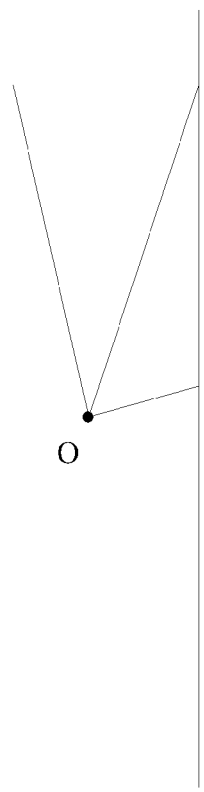
FIG. 3 is a schematic diagram of a first principle of determining a direction of a projection plane in the second embodiment of the keystone correction method for the projection terminal in accordance with the present disclosure.

FIG. 3 is a schematic diagram of the first principle of determining the direction of the projection plane in the second embodiment of the keystone correction method for the projection terminal in accordance with the present disclosure. As shown in FIG. 3, a point O represents the position of the projector, a vertical line represents a vertical projection plane, and three half-lines through the point O represent a projection line of which the projection angle is maximum, a projection centerline and a projection line of which the projection angle is minimum, respectively. It can be seen that at this case the projection centerline of the projector may direct towards the upper inclined side of the horizontal plane and the projection angle of the projection line, of which the projection angle is maximum, is greater than 90°, it is apparent that the projection line of which the projection angle is maximum does not intersect with the vertical projection plane.

In the second case, the projection centerline of the projector directs towards the lower inclined side of or just below the horizontal plane.

Figure 4:
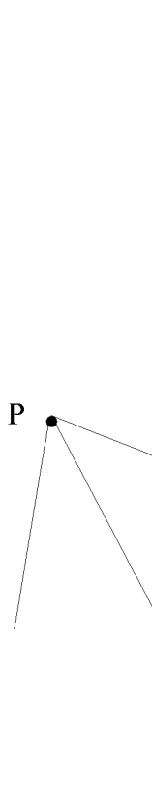
FIG. 4 is a schematic diagram of a second principle of determining the direction of the projection plane in the second embodiment of the keystone correction method for the projection terminal in accordance with the present disclosure.

FIG. 4 is a schematic diagram of a second principle of determining the direction of the projection plane in the second embodiment of the keystone correction method for the projection terminal in accordance with the present disclosure. As shown in FIG. 4, a point P represents the position of the projector, a vertical line represents a vertical projection plane, and three half-lines through the point P represent a projection line of which the projection angle is maximum, a projection centerline and a projection line of which the projection angle is minimum, respectively. It can be seen that at this case the projection centerline of the projector may direct towards the lower inclined side of the horizontal plane and the range of the projection angle of the projection line of the projection terminal is from 0° to 180°, i.e., the projection angle of the projection line of the projection terminal is a positive value. Thus, it can be seen from FIG. 4 that the projection angle of the projection line, of which the projection angle is maximum, is greater than 90°, and it is apparent that the projection line of which the projection angle is maximum does not intersect the vertical projection plane.

In step 203, two projection lines are selected from all projection lines from the projector to the projection plane, i.e., a projection line of which the projection angle is maximum among all projection lines from the projector to the projection plane, and a projection line of which the projection angle is minimum among all projection lines from the projector to the projection plane. A distance of the projector to the projection plane along the projection line of which the projection angle is maximum and a distance of the projector to the projection plane along the projection line of which the projection angle is minimum are obtained.

Here, the projection line of which the projection angle is maximum among all the projection lines from the projector to the projection plane is an upper projection boundary in all projection lines from the projector to the projection plane, and the projection line of which the projection angle is minimum among all the projection lines from the projector to the projection plane is a lower projection boundary in all projection lines from the projector to the projection plane.

In practical applications, the distance of the projector to the projection plane along each of the projection lines may be measured by a distance measuring instrument, which is located inside the projector. The distance measuring instrument includes, but is not limited to, a laser distance measuring instrument, an infrared distance measuring instrument or a ultrasonic distance measuring instrument. When the distance measuring instrument operates, the distance measuring instrument may be rotated according to the projection angle of the projection line, to further measure a distance of the corresponding projector to the projection plane at a corresponding projection angle.

Here, a single or two distance measuring instruments may be used to measure the distances of the projector to the projection plane along the two selected projection lines.

When the distances of the projector to the projection plane along the two selected projection lines are measured by a single distance measuring instrument, the distance measuring instrument measures the distances of the projector to the projection plane along the two projection lines in sequence. When the distances of the projector to the projection plane along the two selected projection lines are measured by two distance measuring instruments, one of the two distance measuring instruments measures the distance of the projector to the projection plane along one of the two selected projection lines, and at the same time, the other distance measuring instrument measures the distance of the projector to the projection plane along the other of the two selected projection lines. When the distances are measured by two distance measuring instruments, the distance measurement time can be reduced.

In step 204, it is determined whether the distance of the projector to the projection plane along the projection line of which the projection angle is minimum is greater than the distance of the projector to the projection plane along the projection line of which the projection angle is maximum. If yes, it is determined that the direction of the projection plane is horizontal, step 205 will be performed; and if not, it is determined that the direction of the projection plane is vertical, step 205 will be performed.

The principle of determining the direction of the projection plane in this step will be illustrated below in two cases.

In the first case, the projection centerline of the projector directs towards the upper inclined side of or just above the horizontal plane.

Figure 5:
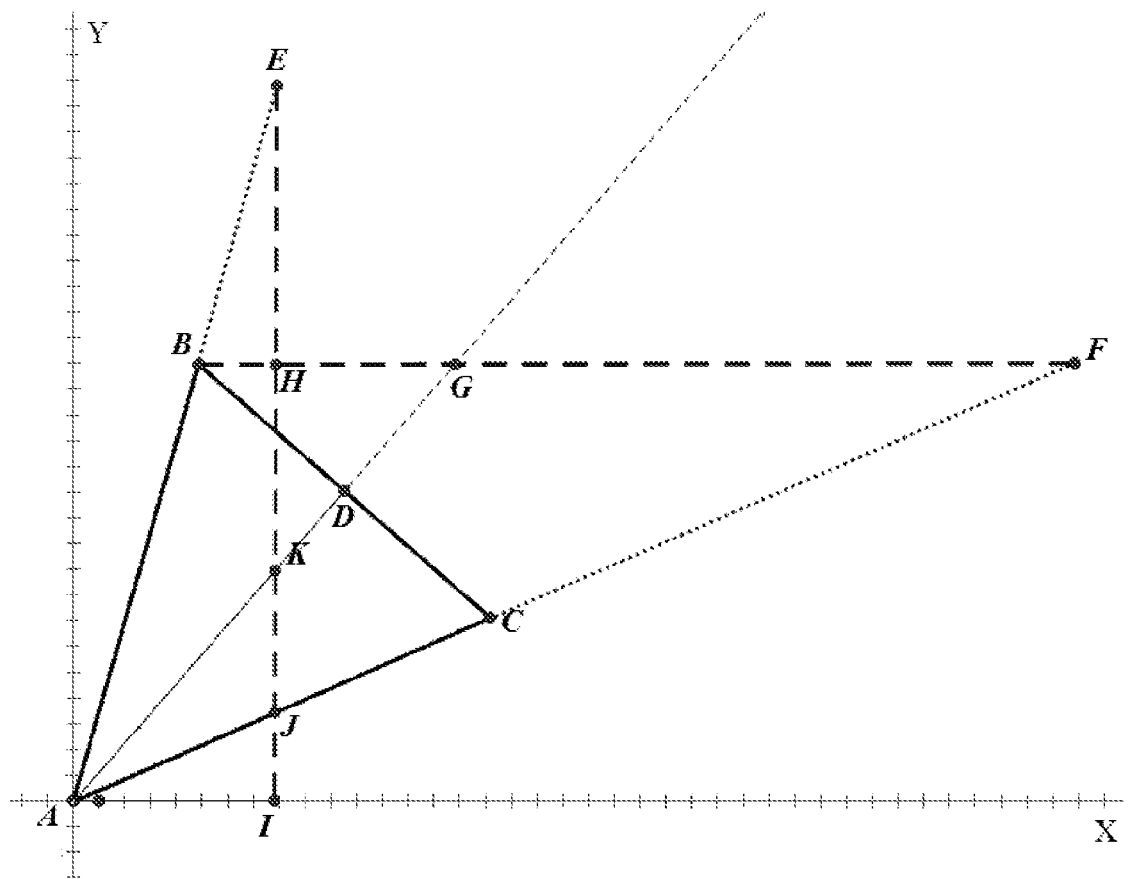
FIG. 5 is a schematic diagram of a third principle of determining the direction of the projection plane in the second embodiment of the keystone correction method for the projection terminal in accordance with the present disclosure.

FIG. 5 is a schematic diagram of a third principle of determining the direction of the projection plane in the second embodiment of the keystone correction method for the projection terminal in accordance with the present disclosure. As shown in FIG. 5, a point A represents the position of the projector, a line segment BF represents a horizontal projection plane, a line segment EI represents a vertical projection plane, and a half-line AD (a half-line emitting from the point A and going through a point D) represents the projection centerline of the projector. The projection angle of the projection centerline of the projector is an included angle between the half-line AD and the positive direction of X-axis. The included angle between the half-line AD and the horizontal plane is greater than 45° and less than 90°, i.e., the included angle between the half-line AD and the positive direction of X-axis is greater than 45° and less than 90°. A half-line AB (a half-line emitting from the point A and going through a point B) represents the projection line of which the projection angle is maximum among all projection lines from the projector to the projection plane, and the projection angle of the projection line of which the projection angle is maximum among all projection lines from the projector to the projection plane is an included angle between the half-line AB and the positive direction of X-axis. A half-line AC (a half-line emitting from the point A and going through a point C) represents the projection line of which the projection angle is minimum among all projection lines from the projector to the projection plane, and the projection angle of the projection line of which the projection angle is minimum among all projection lines from the projector to the projection plane is an included angle between the half-line AC and the positive direction of X-axis.

If the projection plane is a horizontal projection plane represented by the line segment BF, as shown in FIG. 5, a distance of the projector to the horizontal projection plane along the projection centerline of the projector is the length of the line segment AG and a distance of the projector to the horizontal projection plane along the half-line AC is the length of the line segment AF, and a distance of the projector to the horizontal projection plane along the half-line AB is the length of the line segment AB. Since the included angle between the half-line AD and the horizontal plane is greater than 45° and less than 90°, an angle ABF is an obtuse angle, and similarly, an angle AGF is an obtuse angle. Since a side facing to an obtuse angle of an obtuse angled triangle is greater than any of the other sides, the length of the line segment AF is greater than the length of the line segment AG and the length of the line segment AG is greater than the length of the line segment AB, i.e., the distance of the projector to the projection plane along the projection line of which the projection angle is minimum is greater than the distance of the projector to the projection plane along the projection line of which the projection angle is maximum.

If the projection plane is a vertical projection plane represented by the line segment EI, as shown in FIG. 5, the distance of the projector to the horizontal projection plane along the projection centerline of the projector is the length of the line segment AK, and the distance of the projector to the horizontal projection plane along the half-line AC is the length of the line segment AJ, and the distance of the projector to the horizontal projection plane along the half-line AB is the length of the line segment AE. Since the included angle between the half-line AD and the horizontal plane is greater than 45° and less than 90°, an angle AKE is known to be an obtuse angle according to geometrical relationship, and similarly, an angle AJE is an obtuse angle. Since a side facing to an obtuse angle of an obtuse angled triangle is greater than any of the other sides, the length of the line segment AE is greater than the length of the line segment AK, and the length of the line segment AK is greater than the length of the line segment AJ, i.e., the distance of the projector to the projection plane along the projection line of which the projection angle is minimum is less than the distance of the projector to the projection plane along the projection line of which the projection angle is maximum.

In the second case, the projection centerline of the projector directs towards the lower inclined side of or just below the horizontal plane.

Figure 6:
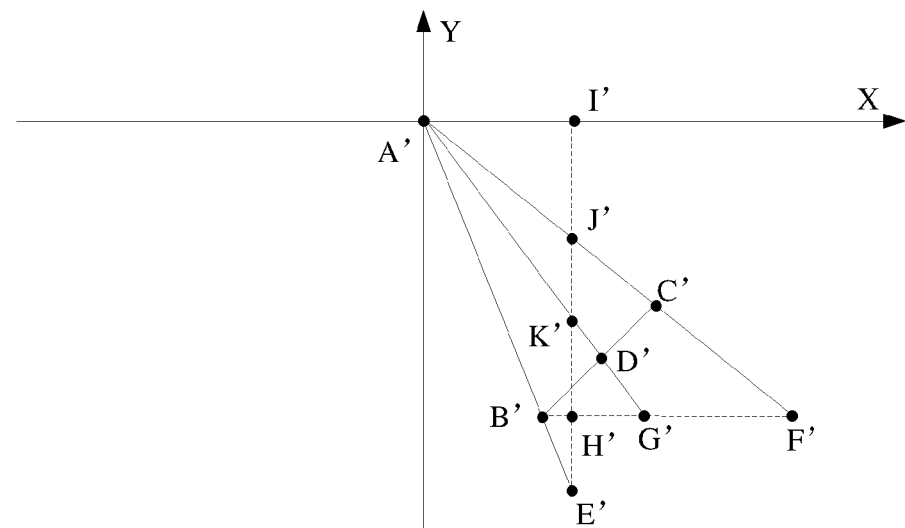
FIG. 6 is a schematic diagram of a fourth principle of determining the direction of the projection plane in the second embodiment of the keystone correction method for the projection terminal in accordance with the present disclosure.

FIG. 6 is a schematic diagram of a fourth principle of determining the direction of the projection plane in the second embodiment of the keystone correction method for the projection terminal in accordance with the present disclosure. As shown in FIG. 6, a point A' represents the position of the projector, the line segment B'F' represents a horizontal projection plane, the line segment E'I' represents a vertical projection plane, and a half-line A'D' (a half-line emitting from the point A' and going through a point D') represents the projection centerline of the projector. The projection angle of the projection centerline of the projector is an included angle between the half-line A'D' and the positive direction of X-axis and takes a positive value. The included angle between the half-line A'D' and the horizontal plane is greater than 45° and less than 90°, i.e., the included angle between the half-line A'D' and the positive direction of X-axis is greater than 45° and less than 90°. A half-line A'B' (a half-line emitting from the point A' and going through a point B') represents the projection line of which the projection angle is maximum among all projection lines from the projector to the projection plane, and the projection angle of the projection line of which the projection angle is maximum among all projection lines from the projector to the projection plane is an included angle between the half-line A'B' and the positive direction of X-axis. A half-line A'C' (a half-line emitting from the point A' and going through a point C') represents the projection line of which the projection angle is minimum among all projection lines from the projector to the projection plane, and the projection angle of the projection line of which the projection angle is minimum among all projection lines from the projector to the projection plane is an included angle between the half-line A'C' and the positive direction of X-axis.

If the projection plane is a horizontal projection plane represented by the line segment B'F', as shown in FIG. 6, a distance of the projector to the horizontal projection plane along the projection centerline of the projector is the length of the line segment A'G', and a distance of the projector to the horizontal projection plane along the half-line A'C' is the length of the line segment A'F', and a distance of the projector to the horizontal projection plane along the half-line A'B' is the length of the line segment A'B'. Since the included angle between the half-line A'D' and the horizontal plane is greater than 45° and less than 90°, an angle A'B'F' is an obtuse angle, and similarly, an angle A'G'F' is an obtuse angle. Since a side facing to an obtuse angle of an obtuse angled triangle is greater than any of the other sides, the length of the line segment A'F' is greater than the length of the line segment A'G', and the length of the line segment A'G' is greater than the length of the line segment A'B', i.e., the distance of the projector to the projection plane along the projection line of which the projection angle is minimum is greater than the distance of the projector to the projection plane along the projection line of which the projection angle is maximum.

If the projection plane is a vertical projection plane represented by the line segment E'I', as shown in FIG. 6, the distance of the projector to the vertical projection plane along the projection centerline of the projector is the length of the line segment A'K', and the distance of the projector to the horizontal projection plane along the half-line A'C' is the length of the line segment A'J', and the distance of the projector to the horizontal projection plane along the half-line A'B' is the length of the line segment A'E'. Since the included angle between the half-line A'D' and the horizontal plane is greater than 45° and less than 90°, an angle A'K'E' is known to be an obtuse angle according to geometrical relationship, and similarly, an angle A'J'E' is an obtuse angle. Since a side facing to an obtuse angle of an obtuse angled triangle is greater than any of the other sides, the length of the line segment A'E' is greater than the length of the line segment A'K', and the length of the line segment A'K' is greater than the length of the line segment A'J', i.e., the distance of the projector to the projection plane along the projection line of which the projection angle is minimum is less than the distance of the projector to the projection plane along the projection line of which the projection angle is maximum.

In step 205, the included angle between the projection centerline of the projector and the projection plane is obtained. If the direction of the projection plane is horizontal, then the included angle between the projection centerline of the projector and the projection plane is equal to the included angle between the projector and the horizontal plane. If the direction of the projection plane is vertical, then the included angle between the projection centerline of the projector and the projection plane is equal to 90° minus the included angle between the projector and the horizontal plane. For example, the included angle between the projection centerline of the projector and the projection plane is 74°, and if the direction of the projection plane is horizontal, then the included angle between the projection centerline of the projector and the projection plane is 74°; and if the direction of the projection plane is vertical, then the included angle between the projection centerline of the projector and the projection plane is 16°.

Keystone correction for the projector is performed according to the included angle between the projection centerline of the projector and the projection plane. Here, a variety of existing implementation manners may be used to perform the keystone correction for the projector according to the included angle between the projection centerline of the projector and the projection plane, and will not be repeated herein.

Third Embodiment

Figure 7:
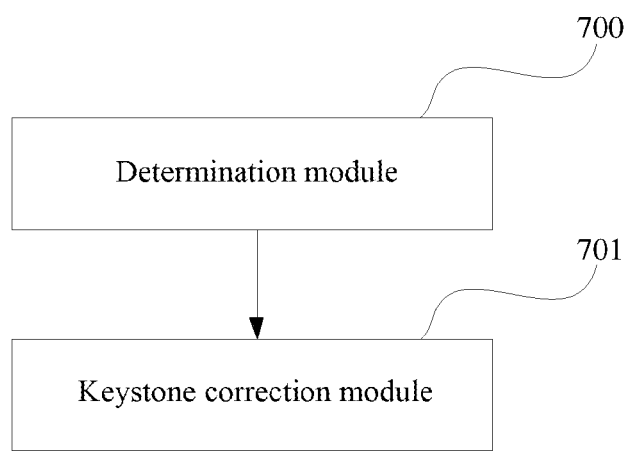
FIG. 7 is a structural block diagram of a keystone correction device for a projection terminal in accordance with an embodiment of the present disclosure.

FIG. 7 is a structural block diagram of a keystone correction device for a projection terminal in accordance with an embodiment of the present disclosure. As shown in FIG. 7, the device includes a determination module 700 and a keystone correction module 701.

The determination module 700 is configured to, when an included angle between a projection centerline of the projection terminal and a horizontal plane is greater than a set acute angle, determine a direction of a projection plane according to a size relationship between a distance of the projection terminal to the projection plane along a first projection line and a distance of the projection terminal to the projection plane along a second projection line. Herein, the first projection line and the second projection line have different projection angles.

The keystone correction module 701 is configured to perform keystone correction for the projection terminal according to the direction of the projection plane.

The determination module 700 is configured to obtain the distance of the projection terminal to the projection plane along the first projection line and the distance of the projection terminal to the projection plane along the second projection line; when a projection angle of the first projection line is less than a projection angle of the second projection line, if the distance of the projection terminal to the projection plane along the first projection line is greater than the distance of the projection terminal to the projection plane along the second projection line, the direction of the projection plane is horizontal; otherwise the direction of the projection plane is vertical; and when the projection angle of the first projection line is greater than the projection angle of the second projection line, if the distance of the projection terminal to the projection plane along the first projection line is less than the distance of the projection terminal to the projection plane along the second projection line, the direction of the projection plane is horizontal; otherwise the direction of the projection plane is vertical. Specifically, the determination module may obtain in sequence the distance of the projection terminal to the projection plane along the first projection line and the distance of the projection terminal to the projection plane along the second projection line, or may obtain simultaneously the distance of the projection terminal to the projection plane along the first projection line and the distance of the projection terminal to the projection plane along the second projection line. The first projection line and the second projection line may be any two of the following three projection lines: a projection line of which a projection angle is maximum among all projection lines from the projection terminal to the projection plane, and a projection line of which a projection angle is minimum among projection lines from the projection terminal to the projection plane, and the projection centerline of the projection terminal.

The keystone correction module 701 is configured to obtain an angle between the projection centerline of the projection terminal and the projection plane according to the direction of the projection plane and an included angle between the projection centerline of the projection terminal and the horizontal plane; and perform the keystone correction for the projection terminal based on the angle between the projection centerline of the projection terminal and the projection plane.

In practical applications, both the determination module 700 and keystone correction module 701 may be implemented by a central processing unit (CPU), a microprocessor unit (MPU), a digital signal processor (DSP) or a field programmable gate array (FPGA) located in the projection terminal.

Fourth Embodiment

An embodiment of the present disclosure further provides a projection terminal including any keystone correction device for the projection terminal in accordance with the third embodiment of the present disclosure.

Fifth Embodiment

An embodiment of the present disclosure further provides a computer storage medium having computer-executable instructions stored therein, which are used to carry out the method in accordance with the embodiments described above, such as, specifically, the methods described in FIG. 1 and/or FIG. 2.

The computer storage medium described in this embodiment may be a hard disk, optical disk, U disk or magnetic tape, optionally, a non-transient storage medium.

The foregoing are alternative embodiments of the present disclosure only and are not intended to limit the protection scope of the present disclosure. It should be understood that any modification made according to the principle of the present disclosure will fall into the protection scope of the present disclosure.

What is claimed is:

1. A keystone correction method for a projection terminal comprising:

when an included angle between a projection centerline of the projection terminal and a horizontal plane is greater than a set acute angle, determining a direction of a projection plane according to a size relationship between a distance of the projection terminal to the projection plane along a first projection line and a distance of the projection terminal to the projection plane along a second projection line, wherein the first projection line and the second projection line have different projection angles; and performing a keystone correction for the projection terminal according to the direction of the projection plane, wherein the determining a direction of a projection plane according to a size relationship between a distance of the projection terminal to the projection plane along a first projection line and a distance of the projection terminal to the projection plane along a second projection line comprises:

obtaining the distance of the projection terminal to the projection plane along the first projection line and the distance of the projection terminal to the projection plane along the second projection line;

when a projection angle of the first projection line is less than a projection angle of the second projection line, if the distance of the projection terminal to the projection plane along the first projection line is greater than the distance of the projection terminal to the projection plane along the second projection line, the direction of the projection plane is horizontal, otherwise the direction of the projection plane is vertical; and when the projection angle of the first projection line is greater than the projection angle of the second projection line, if the distance of the projection terminal to the projection plane along the first projection line is less than the distance of the projection terminal to the projection plane along the second projection line, the direction of the projection plane is horizontal, otherwise the direction of the projection plane is vertical.

2. The method according to claim 1, wherein the obtaining the distance of the projection terminal to the projection plane along the first projection line and the distance of the projection terminal to the projection plane along the second projection line comprises:

obtaining in sequence the distance of the projection terminal to the projection plane along the first projection line and the distance of the projection terminal to the projection plane along the second projection line, or obtaining simultaneously the distance of the projection terminal to the projection plane along the first projection line and the distance of the projection terminal to the projection plane along the second projection line.

3. The method according to claim 1, wherein the first projection line and the second projection line are any two of following three projection lines: a projection line of which a projection angle is maximum among all projection lines from the projection terminal to the projection plane, and a projection line of which a projection angle is minimum among all projection lines from the projection terminal to the projection plane, and the projection centerline of the projection terminal.

4. The method according to claim 1, wherein the performing a keystone correction for the projection terminal according to the direction of the projection plane comprises:
obtaining an angle between the projection centerline of the projection terminal and the projection plane according to the direction of the projection plane and the included angle between the projection centerline of the projection terminal and the horizontal plane; and
performing the keystone correction for the projection terminal based on the angle between the projection centerline of the projection terminal and the projection plane.

5. A keystone correction device for a projection terminal comprising a determination module and a keystone correction module,
wherein the determination module is configured to, when an included angle between a projection centerline of the projection terminal and a horizontal plane is greater than a set acute angle, determine a direction of a projection plane according to a size relationship between a distance of the projection terminal to the projection plane along a first projection line and a distance of the projection terminal to the projection plane along a second projection line,
wherein the first projection line and the second projection line have different projection angles,
wherein the keystone correction module is configured to perform a keystone correction for the projection terminal according to the direction of the projection plane,
wherein the determination module is configured to obtain the distance of the projection terminal to the projection plane along the first projection line and the distance of the projection terminal to the projection plane along the second projection line,
wherein when a projection angle of the first projection line is less than a projection angle of the second projection line, if the distance of the projection terminal to the projection plane along the first projection line is greater than the distance of the projection terminal to the projection plane along the second projection line, the direction of the projection plane is horizontal, otherwise the direction of the projection plane is vertical, and
wherein when the projection angle of the first projection line is greater than the projection angle of the second projection line, if the distance of the projection terminal to the projection plane along the first projection line is less than the distance of the projection terminal to the projection plane along the second projection line, the direction of the projection plane is horizontal, otherwise the direction of the projection plane is vertical.

6. The device according to claim 5, wherein the determination module is configured to obtain in sequence the distance of the projection terminal to the projection plane along the first projection line and the distance of the projection terminal to the projection plane along the second projection line, or to obtain simultaneously the distance of the projection terminal to the projection plane along the first projection line and the distance of the projection terminal to the projection plane along the second projection line.

7. The device according to claim 5, wherein the first projection line and the second projection line are any two of following three projection lines: a projection line of which a projection angle is maximum among all projection lines from the projection terminal to the projection plane, and a projection line of which a projection angle is minimum among all projection lines from the projection terminal to the projection plane, and the projection centerline of the projection terminal.

8. The device according to claim 5, wherein the keystone correction module is configured to obtain an angle between the projection centerline of the projection terminal and the projection plane according to the direction of the projection plane and the included angle between the projection centerline of the projection terminal and the horizontal plane, and perform the keystone correction for the projection terminal based on the angle between the projection centerline of the projection terminal and the projection plane.

9. A projection terminal comprising the device according to claim 5.

10. A non-transitory computer storage medium having computer-executable instructions stored therein, which are used to carry out the method according to claim 1.

11. The method according to claim 2, wherein the first projection line and the second projection line are any two of following three projection lines: a projection line of which a projection angle is maximum among all projection lines from the projection terminal to the projection plane, and a projection line of which a projection angle is minimum among all projection lines from the projection terminal to the projection plane, and the projection centerline of the projection terminal.

12. The method according to claim 2, wherein the performing a keystone correction for the projection terminal according to the direction of the projection plane comprises:
obtaining an angle between the projection centerline of the projection terminal and the projection plane according to the direction of the projection plane and the included angle between the projection centerline of the projection terminal and the horizontal plane; and
performing the keystone correction for the projection terminal based on the angle between the projection centerline of the projection terminal and the projection plane.

13. The device according to claim 6, wherein the first projection line and the second projection line are any two of following three projection lines: a projection line of which a projection angle is maximum among all projection lines from the projection terminal to the projection plane, and a projection line of which a projection angle is minimum among all projection lines from the projection terminal to the projection plane, and the projection centerline of the projection terminal.

14. The device according to claim 6, wherein the keystone correction module is configured to obtain an angle between the projection centerline of the projection terminal and the projection plane according to the direction of the projection plane and the included angle between the projection centerline of the projection terminal and the horizontal plane, and perform the keystone correction for the projection terminal based on the angle between the projection centerline of the projection terminal and the projection plane.

* * * * *